United States Patent [19]

Wright

[11] Patent Number: 4,985,274

[45] Date of Patent: Jan. 15, 1991

[54] METHOD FOR CONTROLLING RELEASE FORCES IN RELEASE COATINGS

[75] Inventor: Antony P. Wright, Midland County, Mich.

[73] Assignee: Dow Corning Corporation, Midland, Mich.

[21] Appl. No.: 520,942

[22] Filed: May 9, 1990

Related U.S. Application Data

[63] Continuation of Ser. No. 391,264, Aug. 9, 1989, abandoned.

[51] Int. Cl.$^5$ .............................................. B05D 3/06
[52] U.S. Cl. ........................................ 427/38; 427/35; 427/44; 427/208.8; 427/331; 156/289
[58] Field of Search .................. 427/38, 35, 44, 208.8, 427/331; 156/289

Primary Examiner—Bernard Pianalto
Attorney, Agent, or Firm—Sharon K. Severance

[57] ABSTRACT

Disclosed is a process to reduce oxygen in an inert gas stream by introducing a reducing gas into the inert gas in the presence of an electron beam. This process of reducing oxygen can be used when producing radiation curable release coatings that need a desired release force. These release coatings, particular, are used in the production of pressure sensitive adhesives.

9 Claims, No Drawings

METHOD FOR CONTROLLING RELEASE FORCES IN RELEASE COATINGS

This is a continuation of copending application Ser. No. 07/391,264 filed on Aug. 9, 1989 now abandoned.

This invention relates to a method for preparing pressure sensitive adhesives in which the release force of the adhesive can be controlled by controlling the amount of oxygen introduced that is reactive with the release coating.

BACKGROUND OF THE INVENTION

Numerous types of silicone release coatings are known in the art. These materials are most frequently used in applications such as release paper for pressure sensitive adhesives (labels, floor tiles, self-adherent carpet, wall paper, etc.), caul sheets and casting sheets. In these applications the release coating is usually applied as a liquid and cured using heat or radiation to form the elastomer.

Radiation curable systems are those that can be cured by a source of ultra violet light (UV) or Electron Beam (EB). In electron beam curing, the silicone release coating is exposed to a beam of accelerated electrons in order to produce free radicals directly. Each electron produces a cascade of many free radicals as it penetrates into the sample. Penetration can be deeper than that obtained in UV cure and the substrate can be opaque to light or UV radiation, however, the presence an inert atmosphere is required. Two types of release coatings are common for electron beam curing. These two are acrylic functional and mercapto-functional compounds with the most common being the acrylic compounds.

The market for "release" products demands laminates with tight control of various specified levels of release force. This is to serve sophisticated product needs such as two sided differential release force tape used, for example, to secure insulating film to window casements. It is current practice to control release forces in thermal cure coatings by the introduction of different amounts of high release force additives into the release coating. It is often awkward to control the blend ratio of additive to coating. This makes it difficult to make minor adjustments in a release coating composition applied in a continuous manner to instantly change the release force performance when switching to a new product specification or when producing out of spec material.

Inert environments are required during electron beam curing to prevent the formation of reactive ozones, peroxides, hydroperoxides, and alcohols. These reactive oxygen containing species react with the organic groups in the coating resulting in the introduction of hydroxylic, carboxylic and other oxygen containing functional groups into the coating surface generally making the coating more polar. The hydroxyl, carboxyl or other groups present in the coating can interact chemically with the reactive ingredients in types of acrylic adhesives resulting in increased release force.

Nitrogen is the most common gas used for providing an inert environment in electron beam curing. However, it is difficult or impossible to obtain a reasonable priced source of nitrogen that is either totally free of oxygen or known to contain a constant level of oxygen. To obtain the lowest release forces, oxygen may need to be as low as 1 to 10 ppm while most commercial suppliers have been found to contain oxygen in the 50 to 200 ppm range.

Methods for providing an inert gas, other than nitrogen, suitable for use in electron beam have been developed. One such method requires the burning of natural gas in air to consume the oxygen. However, these methods result in impure gas streams containing water vapor, carbon dioxide, carbon monoxide and still a trace of oxygen whose level is difficult to control. They also require large volumes of natural gas and special furnaces to combust the natural gas. These methods are not readily used in large commercial applications.

It is an object of this invention to provide a mechanism for controlling the release force of the release coating without making composition changes during operation or using complex processes.

THE INVENTION

Control of release forces in pressure sensitive adhesive laminate constructions can be obtained by controlling the amount of reactive oxygen introduced into the release coating. This invention pertains to a method of controlling the oxygen content in the electron beam chamber by means of a reducing gas that is introduced directly into the chamber.

Oxygen becomes reactive with the release coating when proper catalysis is provided. Electron beams, in particular, are one such catalyst. Other sources of ionizing radiation, such as gamma radiation, may also trigger the reaction between oxygen and the release coating.

By reducing gas, it is meant any gas, resulting activated molecules, or fragments of molecules produced by the introduction of the reducing gas into an electron beam, capable of combining with oxygen, excited oxygen molecules or radical fragments of oxygen produced by the introduction of oxygen into the electron beam. The reducing gases of this invention may be further exemplified by hydrogen, methane, propane, or any hydrocarbon or composition having a volatility at room temperature of at least 1 millimeter mercury, and is capable of supporting combustion in air. The preferred gas of this invention is hydrogen. Although methane has been found to work in this invention it is observed that it produces ozone as a by-product which when handled improperly may result in an unsafe working environment in the area of the electron beam machine.

The reducing gas of this invention may be inactive towards oxygen under normal conditions, but in the electron beam the oxygen and/or the reducing gas are fragmented and/or excited to high energy highly reactive species which exceed the energy for activation of the oxidation/reduction reactions which occur resulting in the disappearance of oxygen from the inert gas. Gases, fragmented by high temperature to species that will support combustion, will also cause the reduction of the oxygen level in an electron beam machine.

This invention is useful by simply measuring the oxygen in the inert gas stream entering the electron beam machine and controlling or adjusting the rate of flow of a reducing gas into the inert gas stream to produce the desired oxygen level. The oxygen content of the inert gas stream can be measured using known techniques or devices at any point prior to its introduction into the electron beam machine or it can be measured directly in the electron beam chamber. It is preferred that an excess of the reducing gas be introduced into the EB machine. An excess of 1.5 to 10 times of the theoretical amount required to reduce any oxygen present is preferred. Since oxygen is removed or reduced in the electron beam machine by the reducing gas the amount present to react with the release coating is reduced as well. This eliminates or reduces the amount of hydroxylic or carboxylic materials formed in the coating after exposure to radiation. Thereby, the release force is governed by the composition of the coating and not by the composition and the by-products that form during the cure. Alternatively, partially controlling the reduction and oxygen level can be used to adjust the level of hydroxylic or carboxylic materials formed to in turn achieve a certain desired release force.

The effect of oxygen on the release force can occur in a cured coating as well as during the cure. The presence of oxygen and a suitable catalyst, such as ionizing radiation, could result in higher release forces in a coating although the coating was cured in a low oxygen containing environment. Also if the cured release coating is allowed to sit for a period of time prior to its formation into the final laminate the initial release force will be lower. It is believed that this is due to the migration of the reactive compounds away from the surface of the coating. Thus, the reactive compounds are not initially present on the coating surface to react with the adhesive.

Pressure sensitive adhesive laminate constructions of this invention are typically made by curing a silicone release coating composition on a basestock sheet. On this coated sheet a solvent based, emulsion based, or hot melt pressure sensitive adhesive is then applied and cured followed by application of a label facestock sheet.

Release coatings useful in this invention are of the acrylic functionality. These may be further exemplified by those containing acryloxy, methacryloxy, acrylamide, acrylamido, thiolacryloxy and other acrylic functional groups. They may be polymers, copolymers, oligimers or mixtures of various components that include a silicone containing material. Additives, known in the art, that change or enhance the performance of the release coating may be blended into the release coating prior to its application and cure on the basestock sheet.

The basestock sheet, adhesive and label facestock sheet may be materials known in the art that are commercially available or made by known methods. It has been found, however, that acrylic adhesives show a greater effect in the variation of the release force with the change in the oxygen content in the electron beam machine. The application and cure of the adhesive and the application of the facestock sheet can be achieved by methods known in the art.

The presence of a reducing gas without any energy will not effect the coating. Higher amounts of energy tend to make the reducing gas more effective, therefore, smaller quantities of the gas may be used. Energy levels of 1 to 10 MegaRads (MR) are applicable for this invention. Higher energy levels could be used however, damage may occur to the base film or the release coating.

Use of a reducing gas in the presence of ionizing radiation, particularly electron beam radiation, to reduce or eliminate oxygen contaminants in an inert gas can be used for applications other than release coatings that require inert gases and are sensitive to trace amounts of oxygen. It may be used by the producer of inert gases prior to bottling or sale to make high quality gases or it may be used in the inert gas feed line for process that require inert gases and are sensitive to oxygen. Anytime an inert gas is required that is low in oxygen this invention may be a means of obtaining such a gas.

So that those skilled in the art can understand and appreciate the invention taught herein, the following examples are presented, being it understood that these examples should not be used to limit the scope of this invention over the limitations found in the claims attached hereto.

EXAMPLE 1

This example is provided to show the effect of different oxygen and energy levels using different release coatings.

An acrylamide functional siloxane of the general formula

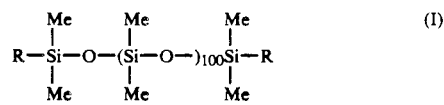

where Me represents the methyl group, R represents the group $YNHCH_2CH_2NYCH_2CH(CH_3)CH_2-$ and Y represents the group $H_2C=CH-CO-$; was coated on treated 2 mil polyethylene film by the offset gravure roll technique and cured at 100 feet per minute in an Energy Sciences Electocurtain (TM) electron beam machine at doses ranging from 1 to 4 MR and oxygen levels from 20 to 250 ppm. The oxygen content in the electron beam chamber was measured using a Delta F (TM) electrolytic type oxygen analyzer.

Within 2 days of the cure, the release film was coated with a solvent based adhesive, NS-80-1068 produced by National Starch, using a 3 mil Bird Bar. The solvent was allowed to evaporated for one minute at room temperature and the adhesive film was then cured two minutes in a stream of hot air at 75° C. It was finally laminated with a 2 mil mylar facestock film under a three pound roller.

The laminate was allowed to age 14 days at 60° C. The release force was measured at room temperature by pulling the liner from the label at a speed of 10 meters per minute at an angle of 180 degrees on a Finat high speed release tester fitted with a calibrated storage oscilloscope. Release force results are given in grams/inch.

Another laminate using an acrylic coating, RC-450 produced by Goldschmidt Company of the Federal Republic of Germany, was produced and tested by the methods previously described.

Release force results of acrylamide and acrylate release coatings are given in Table I. Both appear to show some effect however the acrylamide material appears to be more sensitive to oxygen content and cure energy levels.

TABLE 1

| Oxygen, ppm: | | 20 | 50 | 100 | 150 | 200 | 250 |
|---|---|---|---|---|---|---|---|
| Acrylamide | | | | | | | |
| Dose, MR: | 1 | 83 | | | | | |
| | 2 | 78 | 86 | 88 | 93 | 108 | |
| | 3 | 64 | 124 | | | | 244 |
| | 4 | | 174 | | | | |
| Acrylate | | | | | | | |
| Dose, MR: | 1 | 17 | | | | | |
| | 2 | 17 | 29 | 31 | 31 | 30 | |
| | 3 | 15 | 33 | | | | |
| | 4 | | 43 | | | | |

EXAMPLE 2

This example is provided to show the effect of oxygen using different adhesives.

To the acrylamide release coating (I) used in example 1, a 10% by weight mixture of octyl and decyl acrylates was added as a diluent. The release coating was applied and cured as in example 1 on a 1 mil mylar base film. The adhesives, NS 36-6045 (rubber) and NS 80-1068 (acrylic), were applied, cured and laminated with a 2 mil mylar facestock as in example 1.

Variation in days aged and temperature aged were also studied. Test results are given in Table II. Although there was some change in release force when using the rubber adhesive, the change appears to be more significant with the acrylic adhesive. Release force results are given in grams/inch.

TABLE II

| Days laminate aged: | | | 1 | 1 | 7 | 14 | 21 |
|---|---|---|---|---|---|---|---|
| Temperature aged °C.: | | | 25 | 60 | 60 | 60 | 60 |
| Adhesive | Dose MR | Oxygen ppm | | | | | |
| Rubber | 1 | 20 | 31 | | 16 | | |
| NS 36-6045 | 2 | 20 | | | 15 | | |
| | 3 | 20 | 15 | | 14 | | |
| | 3 | 200 | | 34 | 24 | 34 | |
| Acrylic | 1 | 20 | 13 | 37 | 38 | 52 | 47 |
| NS 80-1068 | 2 | 20 | 13 | 32 | 34 | 45 | 39 |
| | 3 | 20 | 12 | 29 | 38 | 37 | 40 |
| | 3 | 200 | | | 66 | 137 | 188 |

EXAMPLE 3

This example is provided to show how cured coatings may also be effected by the presence of oxygen.

Laminates were prepared as in example 1 using the acrylamide (I) diluted with 10% by weight of the octyl/decyl acrylate and also the RC-450 acrylate based release coating from Goldschmidt. They were cured at 2 MR in 20 ppm oxygen on polypropylene film. The adhesive, NS 80-1068, was applied and cured as previously done. Laminates were aged at 60° C.

A second laminate was prepared, as above, from both the acrylamide and acrylate release coatings except they were passed through the electron beam machine a second time at 2 MR and 200 ppm oxygen prior to applying the adhesive.

Results are given in Table III. A significant increase in release force occurs when the cured release coating is exposed to oxygen and electrons showing the release coating is still reactive to oxygen after cure. Release force results are given in grams/inch.

TABLE III

| | Acrylamide | | | Acrylate | | |
|---|---|---|---|---|---|---|
| Laminate Age, Days: | 1 | 7 | 30 | 1 | 7 | 30 |
| One Pass | 78 | 95 | 120 | 20 | 28 | 44 |
| Two Pass | 148 | 209 | 238 | 90 | 126 | 138 |

EXAMPLE 4

This example is provided to show the effect of liner age on the release force.

Two sets of laminates were prepared using the diluted acrylamide (I) and acrylate release coatings in Example 3 and NS 80-1068 acrylic adhesive produced by National Starch, NS 80-1085Z45 acrylic adhesive produced by National Starch and GMS-263 adhesive produced by Goldschmidt Company. One set of laminates was cured at 20 ppm oxygen and 2 MR while the second set was cured under the same conditions with an additional pass through the electron beam machine at 200 ppm and 2 MR.

The liners cured a second time were made into laminates immediately or allowed to age for 7 days before being laminated. Laminates were aged at 60° C.

Results are given in Table IV. The liners allowed to stand for 7 days prior to being laminated show initial lower release forces. However as the laminate ages the values approach the values of the laminates made from the unaged liners indicating migration of the reactive species in the coating. Release force results are given in grams/inch.

TABLE IV

| | | Acrylamide | | | Acrylate | | |
|---|---|---|---|---|---|---|---|
| Laminate Age, Days: | | 1 | 7 | 30 | 1 | 7 | 30 |
| Liner Age, Days: | | | | | | | |
| NS 80-1068 | | | | | | | |
| One Pass | 0 | 75 | 102 | 111 | 20 | 36 | 47 |
| Two Pass | 0 | 186 | 228 | 178 | 127 | 118 | 107 |
| | 7 | 139 | | 169 | 78 | | 113 |
| NS 80-1085Z45 | | | | | | | |
| One Pass | 0 | 63 | 96 | 105 | 46 | 79 | 93 |
| Two Pass | 0 | 304 | 323 | 202 | 54 | 86 | 103 |
| | 7 | 184 | | 212 | 231 | | 328 |
| GMS-263 | | | | | | | |
| One Pass | 0 | 73 | 111 | 127 | 37 | 80 | 99 |
| Two Pass | 0 | 206 | 208 | 166 | 232 | 269 | 287 |
| | 7 | 133 | | 214 | 130 | | 245 |

EXAMPLE 5

This example is provided to show the effect of the reducing gas and electron beam on the oxygen content in an inert gas.

The effect of methane and hydrogen on oxygen level vs. electron beam current was measured starting with a nitrogen source that was measured using the oxygen analyzer to contain 260 ppm oxygen. The nitrogen flowed at 4.6 cubic feet (130 liters) per minute into the Electron Beam chamber. The amount of reducing gas was varied. Results are given in Table V. Methane appears to be more effective than hydrogen, however, ozone was detected as being produced when the methane was used.

TABLE V

| Electron Current | 20 Volume % Gas | | ppm Oxygen | |
|---|---|---|---|---|
| milliamp, 165 KV | Methane | Hydrogen | Methane | Hydrogen |
| 0 | 0 | | 260 | |
| 4 | 0.031 | | 30 | |
| 4 | 0.061 | | 25 | |
| 2 | 0.12 | | 90 | |
| 4 | 0.12 | | 20 | |
| 2 | 0.23 | | 80 | |
| 4 | 0.23 | | 20 | |
| 2 | | 1.5 | | 30 |
| 4 | 0.47 | 1.5 | 18 | 20 |
| 0 | 0.77 | 3.8 | 260 | 300 |
| 1 | 0.77 | 3.8 | 110 | 20 |
| 2 | 0.77 | 3.8 | 50 | 5 |
| 3 | 0.77 | 3.8 | 30 | 5 |
| 4 | 0.77 | 3.8 | 20 | 5 |

EXAMPLE 6

This example shows the use of a reducing gas in the presence of an electron beam to control oxygen when producing pressure sensitive adhesives.

The acrylamide release coating (I) of example 1 was mixed with 6.6% by weight of the octyl/decyl acrylate and 4.4% by weight of tripropylene glycol diacrylate and coated on kraft base paper using a blade coater set at 12 pounds/sq. in. to give about 1 lb/sq ream coat weight. Samples were cured at 3 MR, 3 milliamp electron current at 165 KV and 68.7 ft/min belt speed. Sample A was cured in nitrogen containing 225 ppm oxygen (4.6 cu ft/min) while Sample B was cured using nitrogen from the same source also containing 225 ppm oxygen (4.6 cu ft/min) with 1000 cc/min methane (0.77 volume percent). The oxygen analyzer indicated 20 ppm oxygen when the electron beam was operational.

National Starch NS 80-1068 acrylic adhesive was applied and cured (example 1) followed by the application of matte litho paper label stock (produces higher release forces than mylar). Three and ten day, 60° C., aged laminates were tested for release forces. Results in grams per inch are given in Table VI.

TABLE VI

| Laminate Age, Days: | 3 | 10 |
|---|---|---|
| Sample A | 167 | 316 |
| Sample B | 109 | 216 |

What is claimed is:

1. A process for controlling release forces of radiation curable release coatings comprising controlling the amount of oxygen, wherein said oxygen is reactive with said coating, by the introduction of a reducing gas, wherein said reducing gas is reacted with oxygen in the presence of electron beam radiation.

2. A process as claimed in claim 1 wherein the reducing gas is methane.

3. A process as claimed in claim 1 wherein the reducing gas in hydrogen.

4. A process as claimed in claim 1 wherein the release coating contains acrylic functionality.

5. A process of producing pressure sensitive adhesives comprising
  (A) applying a release coating on a basestock sheet;
  (B) curing said coating using electron beam radiation in the presence of
    (i) an inert gas and
    (ii) a reducing gas wherein said reducing gas reacts with oxygen in the presence of the electron beam radiation;
  (C) applying an adhesive to the cured film of (B);
  (D) curing said adhesive; and
  (E) applying a facestock sheet to the adhesive of (D).

6. A process as claimed in claim 5 wherein the release coating contains acrylic functionality.

7. A process as claimed in claim 5 wherein the adhesive is of an acrylate type.

8. A process as claimed in claim 5 wherein the reducing gas is methane.

9. A process as claimed in claim 5 wherein the reducing gas is hydrogen.

* * * * *